Figure 1:
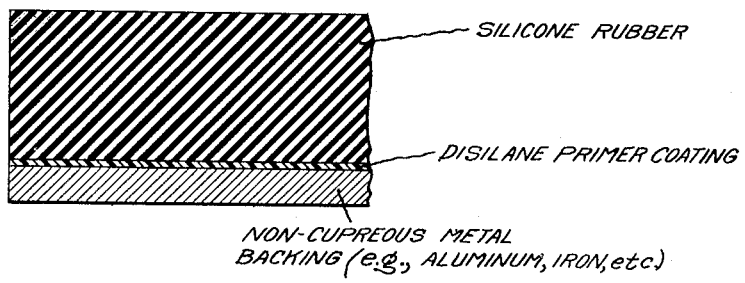

June 24, 1952  R. SMITH-JOHANNSEN  2,601,337
METHOD FOR IMPROVING THE ADHESION OF ORGANOPOLYSILOXANES
TO SOLID SURFACES
Filed Feb. 17, 1949

Inventor:
Robert Smith Johannsen,
by Abraham Cohen.
His Attorney.

Patented June 24, 1952

2,601,337

UNITED STATES PATENT OFFICE 2,601,337

METHOD FOR IMPROVING THE ADHESION OF ORGANOPOLYSILOXANES TO SOLID SURFACES

Robert Smith-Johannsen, Schenectady, N. Y., assignor to General Electric Company, a corporation of New York Application February 17, 1949, Serial No. 77,045

25 Claims. (Cl. 154—139)

This invention is concerned with improving the adhesion of silicone rubbers and silicone resins to solid surfaces other than copper. More particularly, the invention relates to a process for improving the adhesion to a non-cupreous solid surface of an organopolysiloxane selected from the class consisting of (1) solid, elastic, curable organopolysiloxanes and (2) resinous organopolysiloxanes, which process comprises treating the said surface with a composition comprising a disilane corresponding to the general formula $(R)_n Si_2(X)_{6-n}$ where R is a monovalent hydrocarbon radical, X is a halogen, and $n$ is an integer equal to from 1 to 4, prior to applying the organopolysiloxane to the surface.

One of the objects of this invention is to improve the adhesion of silicone rubbers and silicone resins to various surfaces other than copper or copper alloys so as to give a heat-resistant and cold-resistant bond.

Another object of this invention is to improve the adhesion of silicone resins to various metals and siliceous surfaces such as glass and ceramics.

A still further object of the invention is to permit silicone rubbers to be bonded easily and quickly to various metals, glass, ceramics, synthetic plastic surfaces, etc., so as to obtain a bonding zone highly resistant to deterioration at elevated temperatures and capable of remaining flexible at very low temperatures.

Other objects of this invention will become more apparent as the description thereof proceeds.

Solid, elastic, curable organopolysiloxanes (for brevity hereinafter referred to as "silicone rubbers") and resinous organopolysiloxanes (for brevity hereinafter referred to as "silicone resins"), because of their unusual resistance to heat, have been found to be eminently suitable for various insulating and gasketing purposes. Because of their inertness to most chemicals and low degree of wetting, great difficulty has been encountered in adhering silicone rubbers and silicone resins securely to various solid surfaces. Although it is possible to effect bonding of the silicone rubbers and resins to some surfaces by complicated procedures, the bond thus obtained has seldom been satisfactory and usually has a heat resistance inferior to silicone rubber or resin, and has been subject to the additional objection that, under stresses, the bond between the rubber or resin and the surface to which it is adhered has weakened first.

I have now discovered that I am able to effect a bond between either silicone rubbers or silicone resins to various solid surfaces other than copper whereby there is obtained a bonding zone which is at least as strong as either the silicone rubber or the silicone resin. In accordance with my invention, I accomplish the bonding of the silicone rubber or the silicone resin by first coating or priming the surface to which the silicone material is to be bonded with a composition comprising a disilane corresponding to the general formula $(R)_n Si_2(X)_{6-n}$ where R is a monovalent hydrocarbon radical (for instance, an alkyl, aryl, alkaryl and aralkyl radical, etc.), X is a halogen (for instance, chlorine, bromine, fluorine, etc.) and $n$ is an integer equal to from 1 to 4. Preferably R is a methyl group.

Figure 2:
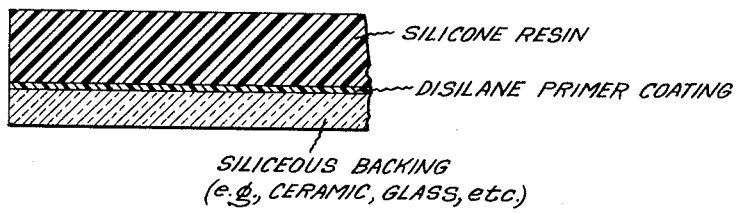

The two figures of the accompanying drawing illustrate two forms of my claimed invention. Thus, Fig. 1 shows a silicone rubber adhered by means of an intermediate disilane primer coating to a non-cupreous metal backing, for instance, aluminum, iron, etc. Fig. 2 shows a silicone resin adhered by means of an intermediate disilane primer coating to a siliceous backing, for example, ceramic, glass, etc.

Of particular value as a priming coating is a fraction comprising essentially a mixture of compounds embraced by the aforementioned formula which is obtained as a high boiling residue (boiling point from about 140° to 163° C., especially from approximately 150° to 160° C.) in the preparation of methylchlorosilanes by the passage of methyl chloride over heated silicon in the presence of a suitable catalyst in accordance with the procedure disclosed and claimed in Rochow Patent 2,380,995, issued August 7, 1945, and assigned to the same assignee as the present invention.

Examples of compounds covered by the aforementioned formula which may be employed in the practice of this invention are, for instance, dimethyltetrachlorodisilane, including its various isomers, such as, for instance, methyl pentachlorodisilane, phenyl pentabromodisilane, 1,2-dimethyl-1,1,2,2-tetrachlorodisilane, 1,1-dimethyl-1,2,2,2-tetrachlorodisilane, etc.; trimethyltrichlorodisilane, including its various isomers, etc.; tetramethyldichlorodisilane, including its various isomers, etc.; tetraethyldichlorodisilane, triamyltrichlorodisilane, dimethyltetrabromodisilane, dimethyldiethyldichlorodisilane, diphenyltetrachlorodisilane, triphenyltrichlorodisilane, tetraphenyldichlorodisilane, ditolyltetrabromodisilane, tetra-(2-ethylphenyl)dichlorodisilane, tetrabenzyldichlorodisilane, etc.

It is, of course, understood that in the practice of my claimed invention mixtures of two or more disilanes corresponding to the above general formula may also be employed without departing from the scope of the invention. The use of disilanes corresponding to the above-mentioned general formula is unique in its effect since attempts to use monosilanes, for example, the organohalogenosilanes in place of the disilanes gives unsatisfactory results and poor bonding.

Among the many surfaces to which I have found silicone rubbers and silicone resins can be advantageously bonded may be mentioned, for instance, various siliceous surfaces, e. g., glass (including glass cloth and tape), ceramics, porcelains, etc.; various metal and metal alloy surfaces, for instance, silver, iron, steel, cadmium, platinum, magnesium, aluminum, tin, lead, etc., and alloys thereof; various synthetic resinous and rubbery surfaces, for example, polystyrene, polymeric methyl methacrylate, polymeric tetrafluoroethylene, polymeric trifluorochloroethylene, nylon (sheets or filaments), cellulose acetate, organopolysiloxane resins and rubbers (that is, the bonding of one organopolysiloxane resinous surface or rubber surface to another), phenolic resinous surfaces, etc.; as well as other miscellaneous surfaces, such as, wood, cloth, etc.

As far as I am aware, any solid surface may be bonded by my claimed process with the exception of a copper or copper alloy surface. It has been found that treatment of the copper surface with the disilane followed by application of either silicone rubber or silicone resin to the coated surface gives an unsatisfactory bond. Best results for bonding silicone resins or rubbers to copper or copper alloys are obtained by the process described in my copending application, Serial No. 77,044 filed concurrently herewith and assigned to the same assignee as the present invention.

The particular silicone resin or silicone rubber employed in the practice of my invention is not critical, and any one of the many known in the art may be employed. Among the silicone resins which may be used are, for example, those disclosed and claimed in the various Rochow Patents 2,258,218-222, issued October 7, 1941, and assigned to the same assignee as the present invention, as well as the fluorinated organopolysiloxane resins disclosed and claimed in Rochow application, Serial No. 13,087, filed March 4, 1948, also assigned to the same assignee as the instant application.

Any of the various silicone rubbers known in the art may be bonded in accordance with my claimed process. For example, I may use the methylsiloxane synthetic elastomers disclosed and claimed in Agens Patent 2,448,756, issued September 7, 1948, or synthetic elastic products disclosed and claimed in Sprung et al. Patent 2,448,556, issued September 7, 1948, or the synthetic elastic products disclosed and claimed in the copending application of Murray M. Sprung, Serial No. 722,457, filed January 16, 1947 (now U. S. 2,484,595 issued October 11, 1949) or in the copending Krieble et al. application Serial No. 598,914, filed June 11, 1945 (now U. S. 2,457,688 issued December 28, 1948), all the aforementioned patents and applications being assigned to the same assignee as the present invention. It will, of course, be understood by those skilled in the art that other silicone rubbers, that is, solid, elastic organopolysiloxanes containing different organic substitutents connected to the silicon atoms by carbon-silicon linkages may be employed without departing from the scope of this invention. The particular silicone rubber or silicone resin used is not critical and it is not intended that the applicant be limited to any one class or type of silicone rubber or silicone resin.

Although, as pointed out above, various silicone rubbers and silicone resins may be employed, for certain applications I prefer to use a solid, elastic, curable methylpolysiloxane comprising essentially a polymeric dimethylpolysiloxane containing up to two mol per cent copolymerized monomethylsiloxane, the said elastic methylpolysiloxane being more particularly described in the aforementioned Agens patent. With regard to the silicone resin employed, I have found that methylphenylorganopolysiloxane resins having an average of from about 1.2 to 1.7 total methyl and phenyl groups per silicon atom are satisfactory in many applications where increased flexibility of the resin is desired.

Although the various silicone rubbers or silicone resins may be employed per se, I have found it desirable, especially for economical reasons and to increase the strength of the bonds, to incorporate in the said silicone materials various fillers usually employed in the art as, for instance, titanium dioxide, titanium nitride, titanium hydride, ferric oxide, calcium carbonate, various silicates, diatomaceous earth, lithopone, magnesium oxide, etc. In some applications, especially where it is desired to obtain good heat transfer properties between flexible metal tapes coated with a filled silicone rubber, and a cold surface, I have found it extremely desirable that the filler employed comprise titanium dioxide or silica.

Since after applying either the silicone rubber or silicone resin to the particular primed surface, it is usually desirable to cure the silicone surface by the application of heat, it has been found advisable to incorporate a cure accelerator in either the resin or rubber, prior to application to the primed surface. Various cure accelerators may be employed for accelerating the conversion of silicone resins to the substantially infusible state. Among such silicone resin cure accelerators may be mentioned the various metal salts of organic acids soluble in silicone resins, for instance, those particularly disclosed and claimed in Welsh Patent 2,449,572, issued September 21, 1948, and assigned to the same assignee as the instant application. Although there are a number of cure accelerators for silicone rubbers which may be used for the purpose, I have obtained good acceleration of the cure by incorporating from about 0.2 to 6 per cent, by weight, or more benzoyl peroxide or tertiary butyl perbenzoate, based on the weight of the unfilled silicone rubber, the use of the former cure accelerator being more particularly disclosed and claimed in Wright et al. Patent 2,448,565, issued September 7, 1948, and the use of the latter cure accelerator being disclosed and claimed in Marsden application Serial No. 763,445, filed July 24, 1947, now U. S. Patent 2,521,528, issued September 5, 1950, both patents being assigned to the same assignee as the present invention.

The general procedure for practicing my claimed invention involves first applying a coating of the organohalogenodisilane to the surface to which it is desired to adhere the silicone resin or rubber. This may be accomplished, for instance by dipping the surface into a suitable form of the disilane, e. g., a solution of the disilane, or applying the disilane, either by wiping or spraying the disilane either in a dilute solution or concentrated form onto the particular surface. Thereafter, the coated surface is washed thoroughly with water to remove substantially all traces of hydrogen halide resulting from the hydrolysis of the silicon-bonded halogens. Where the surface to which the silicone rubber or silicone resin is being bonded comprises a metallic surface, it has been found advisable in order to obtain improved bonding to have the surface free of contamination by foreign impurities, such as dirt, grease, etc. In some instances, especially in the case of highly polished surfaces like stainless steel, it has been found expedient to roughen the surface slightly with emery cloth or steel wool.

Thereafter either the silicone resin or silicone rubber, as the case may be, is applied to the coated surface and, if desired, the total assembly is baked at temperatures conducive for curing either of the silicone materials. Usually such baking temperatures are of the order of from about 150° to 250° C. for from fifteen minutes to two hours or more in the case of the silicone resin, and from about 100° to 250° C. for from a few minutes to several hours or more for the silicone rubber. Each application will recommend the particular cure cycle employed.

As pointed out above, the organohalogenodisilane may be employed either in solution form or in the pure concentrated form. Among the solvents which may be used for making solutions of the organohalogenodisilane may be mentioned, for example, petroleum spirits, the aromatic hydrocarbons, for instance, benzene, toluene, xylene, etc., as well as other suitable inert solvents, such as, for instance, fluorinated xylene, halogenated hydrocarbons, etc. In most cases I have found it satisfactory to use from about 1 to 5 per cent solutions of the organohalogenodisilane in the particular solvent. In the case of some metals, for instance, in adhering silicone rubber to silver surfaces, it has been found expedient to use the concentrated form of the organohalogenodisilane.

In order that those skilled in the art may better understand how the present invention may be practiced, the following examples are given by way of illustration and not by way of limitation. All parts are by weight.

EXAMPLE 1

Three glass slides were dipped in cleaning solution, washed with water, and dried. One glass slide was then immersed in a 1 per cent toluene solution of dimethyltetrachlorodisilane, removed, allowed to air-dry, and washed thoroughly with water. A second slide was coated with a liquid polyorganohalogenopolysiloxane, particularly a polymethylchloropolysiloxane of the type more particularly disclosed in Sauer Patent 2,421,653, issued June 3, 1947 and assigned to the same assignee as the present invention. Each of the three glass slides, including the untreated glass slides, was painted with a solution of a methyl phenylpolysiloxane resin, and heated at around 200° C. for approximately one hour. At the end of this time the cured resin could be easily removed from the untreated glass slide by scraping with a knife edge, and only slightly more pressure was required to remove the silicone resin from the surface of the glass slide which had previously been coated with the polymethylchloropolysiloxane.

In contrast to the foregoing two results, the resin-coated glass slide, which had previously been treated with the dimethyltetrachlorodisilane, showed the strongest adhesion of the silicone resin as evidenced by the fact that scratching the surface of the glass slide with a knife edge failed to break the bond between the resin and the glass slide, but instead resulted in scraping of the resin itself and destruction of the resinous surface before destruction of the bond. This is clear evidence that the adhesive forces between the glass and the resin were stronger than the cohesive forces existing in the resin.

EXAMPLE 2

In this example three strips of glass tape were impregnated (by dipping four times) with a methyl phenyl silicone resin. Prior to impregnation with the silicone resin, one sample of the glass tape was untreated, while another sample of the glass tape was dipped in a dilute toluene solution of the polymethylchloropolysiloxane described in Example 1.

The third sample of glass tape was dipped into a 1 per cent toluene solution of a high boiling methylchlorodisilane residue having a boiling point of about 140° to 163° C. obtained in the reaction between methyl chloride and heated silicon at a temperature of about 250° to 300° C. using copper as a catalyst in accordance with the process described and claimed in the aforementioned Rochow Patent 2,380,995. This high boiling residue was a mixture of chlorodisilanes of which about 85 to 95 per cent comprised dimethyltetrachlorodisilane (including its various isomers, such as those disclosed previously above) as well as small amounts of trimethyltrichlorodisilane and tetramethyldichlorodisilane. This latter treated glass tape was allowed to air-dry, then thoroughly washed with water and dried prior to application of the methyl phenylpolysiloxane resin.

Each of the three coated (that is with silicone resin) glass tapes was heated at about 200° C. for approximately one hour to convert the silicone resins to the infusible state, and samples of each of the glass tapes were tested for dielectric strengths with the following results:

| Untreated Glass Tapes | Glass Tape Treated With Polymethyl-chloro-Poly-siloxane | Glass Tape Treated With Mixture of Methylchloro-disilanes |
|---|---|---|
| 1761 V/M | 1437 V/M | 2000 V/M |

From the foregoing results, it is apparent that treatment of the glass tape in accordance with my invention improves the dielectric strength thereof and makes it comparable to the dielectric strength of mica. This improvement is believed due to the fact that improved adhesion has been obtained between the silicone resin and the surface of the glass tape.

EXAMPLE 3

Thin sheets of aluminum, soft steel, and silver were thoroughly cleaned by immersing the same in degreasing solvents and cleaning solutions. The aluminum sheet was cleaned in a hot aqueous solution of chromium trioxide and phosphoric acid. The aluminum and soft steel surfaces were then dipped in a dilute solution (1 to 2 per cent toluene solution) of dimethyltetrachlorodisilane, air-dried, and thoroughly washed with water to remove all traces of hydrogen chloride. The silver surface was wiped with undiluted dimethyltetrachlorodisilane instead of using the dilute solution thereof and also thoroughly washed with water. To each of the cleaned surfaces was applied a coat of a methyl phenyl polysiloxane resin of the type described in Example 1 and the materials heated at around 200° C. for about one hour. In each case a tough adherent coating of the resin was obtained which in every instance exhibited a much better bond to the metallic surface than was obtainable by coating the same surface with the methyl phenyl polysiloxane resin omitting the priming coating on the metallic surface.

EXAMPLE 4

In this example a ceramic insulator was immersed for a few seconds in a one per cent toluene solution of a high boiling methylchlorodisilane residue of the type described in Example 1, air-dried, thoroughly washed with water and dried. To this dried surface was applied a coating of a methyl phenyl polysiloxane resin, and this latter coated object heated at elevated temperatures to effect curing of the polysiloxane resin. A stronger adherent bond was found to exist between the ceramic surface and methyl polysiloxane resin than was obtainable where the methylchlorodisilane coating was omitted from the surface of the ceramic.

The following examples illustrate the utility of my claimed invention for adhering various organosiloxane gums and elastomers (generically referred to as "silicone rubbers") to all kinds of metallic, plastic, etc., surfaces. To carry out the following examples, two types of silicone rubber pastes were prepared as follows:

*Silicone rubber paste No. 1*

Liquid polymeric dimethylsiloxane containing approximately one mol per cent copolymerized monomethylsiloxane was condensed with ferric chloride hexahydrate in the manner disclosed and claimed in the aforementioned Agens Patent 2,448,756 until a solid elastic product was obtained. About 100 parts of this methylsiloxane gum was mixed on rubber compounding rolls with 200 parts lithopone, and 2 parts benzoyl peroxide until a pasty dough-like silicone rubber was obtained.

*Silicone rubber paste No. 2*

A liquid polymeric dimethylsiloxane containing approximately one mol per cent copolymerized monomethylsiloxane was heated in the presence of about one per cent, by weight, potassium hydroxide until a solid elastic product was obtained. To 100 parts of this elastic product was added 200 parts titanium dioxide and 2 parts benzoyl peroxide and the total mixture compounded on rubber compounding rolls until a homogeneous silicone rubber paste was obtained.

Another silicone rubber paste was prepared by condensing the same liquid polymeric dimethylsiloxane containing about one mol per cent copolymerized monomethylsiloxane in the same manner as described above using ferric chloride hexahydrate by carrying the condensation of the solid elastic product to the stage where when a hot drop was removed from the thickening mass and touched to a cold surface a string just failed to be evident but instead the material snapped back. This method of condensing liquid polymeric siloxanes is more particularly disclosed and claimed in the copending Poskitt et al. application, Serial No. 2,971, filed January 17, 1948 (now U. S. 2,467,853 issued April 19, 1949), and assigned to the same assignee as the present invention. When the above-described test was obtained, an amount of titanium dioxide equal to the starting liquid polymeric methylsiloxane was added, together with a small amount of stearic acid, and the heating continued until a smooth homogeneous paste was obtained. About 100 parts of this latter paste was mixed with 900 parts of the above-described potassium hydroxide-condensed silicone rubber paste until a homogeneous thick pasty mixture was obtained.

EXAMPLE 5

A thin (about 2 mils) flexible sheet of aluminum was cleaned by passing the same through a solvent degreasing bath and thereafter through a hot aqueous solution of chromium trioxide and phosphoric acid. Thereafter the cleaned aluminum strip was immersed briefly in a one per cent toluene solution of essentially pure dimethyltetrachlorodisilane, air-dried, washed thoroughly with water and dried. In one case silicone rubber paste No. 1 was applied in the form of a thin coating to part of the disilane treated aluminum surface and in another case silicone rubber paste No. 2 was applied to another portion of the aforementioned treated aluminum surface. Each sample was then heated about 15 minutes at approximately 150° C. to effect curing of the silicone rubber to the infusible and insoluble state. Examination of the samples revealed that in both instances the silicone rubber was firmly bonded to the aluminum surface and could not be stripped therefrom. Attempts to remove the cured silicone rubber layer resulted in tearing of the silicone rubber itself indicating that the bond between the latter and the aluminum surface was stronger than the silicone rubber per se.

As further indication of the manner in which the claimed invention may be employed, an uncured silicone rubber coated aluminum sheet was prepared as above using silicone rubber paste No. 1. Another aluminum sheet was cleaned and treated with dimethyltetrachlorodisilane, washed with water, dried and applied to the silicone rubber surface of the first aluminum sheet and the total assembly maintained under contact pressure while heating the same at about 150° C. for approximately 10 minutes. Examination of this laminated sample revealed that attempts to strip one aluminum sheet from the other resulted in destruction of the cured silicone rubber glue line with no apparent evidence that the bond between the cured silicone rubber and either one of the aluminum sheets could be broken before breaking occurred in the silicone rubber glue line.

A porcelain surface was treated by wiping it with a dilute toluene solution of dimethyltetrachlorodisilane and the treated surface washed thoroughly with water. To this surface was applied a sample of the thin flexible sheet of aluminum containing uncured silicone rubber paste No. 2 on its surface, the silicone rubber paste being placed in contact with the treated porcelain surface. A hot iron (about 105° C.) was applied to the aluminum backing for a few seconds. At the end of this time it was found that the silicone rubber had cured to the substantially infusible and insoluble state and that the aluminum was firmly bonded to the porcelain surface and could only be detached therefrom by destroying the silicone rubber glue line, the bond between the aluminum and the bond between the porcelain surface and the silicone rubber remaining substantially intact.

The use of aluminum surfaces bonded to silicone rubber for many applications is illustrated by the following wherein it was desired to effect a bond between silver and polystyrene. An aluminum sheet coated with uncured silicone rubber paste No. 1 (the aluminum sheet having been first treated briefly as described above with dimethyltetrachlorodisilane) was bonded to a silver surface by coating the latter surface first with the aforementioned dimethyltetrachlorodisilane. This total assembly was pressed together with the aluminum-silicone rubber article at elevated temperatures (105° C. for about 10 minutes) until curing of the silicone rubber was obtained to yield a strong bond between the silver and aluminum. The aluminum surface was then adhered to the polystyrene surface by means of a conventional adhesive (for example, a cold-setting phenolic adhesive). The bond between the silver and the polystyrene was firm and exhibited excellent flexibility at low temperatures for which this particular combination of materials was intended. It is, of course, apparent that various plastic backings for the silicone rubber can be employed in place of the aluminum sheet without departing from the scope of the invention. By means of my claimed invention, the very desirable low temperature flexibility of silicone rubber can be taken advantage of where heretofore it had been the custom to use other flexible materials for gasketing purposes, which where generally unsatisfactory at low temperatures.

The flexible aluminum sheets comprising cured silicone rubber bonded securely to the aluminum surface can be employed in the form of tapes for use as gaskets between panels of either copper, or aluminum, or other thin metal sheets used for protective purposes such as, for instance, in aluminum, copper, or other metal roofs. The use of such aluminum or other metal tapes is more particularly disclosed and claimed in my copending application filed concurrently herewith, Serial No. 77,043, and assigned to the same assignee as the present invention. As pointed out in my copending application, the other surface of the aluminum free of the silicone rubber may be coated with an ordinary pressure-sensitive adhesive.

Copper heat transfer tapes of the type disclosed and claimed in my copending application Serial No. 77,044, referred to previously, may be adhered to porcelain surfaces through the medium of the uncured silicone rubber layer in the same manner as disclosed above with regard to the aluminum-silicone rubber sheets by first treating the porcelain surface with an organohalogenodisilane of the formula disclosed in the first paragraph of this specification or mixtures of such organohalogenodisilanes.

EXAMPLE 6

In some high compression outboard motors used in motorboat racing, it has been the custom to employ thinner gaskets than standard for the cylinder heads. Among such gaskets usually used are those made of asbestos or of copper. Neither are pressure tight and when thin gaskets of these materials are employed, it was found that, for example, the asbestos gaskets invariably "blew out" in a short time, and the copper ones did not seal tightly enough.

In order to overcome the above defects, glass cloth was treated with dimethyltetrachlorodisilane and silicone rubber paste No. 1 was applied to the treated surface. The surface of the aluminum cylinder head was cleaned by dipping it into the hot aqueous mixture of chromium trioxide and phosphoric acid, washed with water, dried and this surface in turn was coated with dimethyltetrachlorodisilane and again washed and dried. The silicone rubber coated glass cloth was applied to the treated aluminum head with the silicone rubber in contact with the aluminum head and the total assembly heated at about 200° C. for approximately twelve hours. In actual tests conducted on outboard motors containing this type of gasketing, it was found that a much greater compression at higher R. P. M. was obtained than before on the same motor and, in addition, there was apparently no evidence of leaking of any pressure nor was it necessary to replace the gasket due to "blowing out" even though the thickness of the gasket was approximately one-half that previously used for asbestos gaskets. After repeated runs using the outboard motor in various races, examination of the gasket revealed that it was still intact and in as good condition as when inserted.

EXAMPLE 7

Cured silicone rubber was adhered to magnesium window frames to serve as gaskets by applying to the surface of the magnesium a coating of dimethyltetrachlorodisilane, washing the said surface, and placing a thin film of silicone rubber paste No. 1 on the treated magnesium surface, applying the cured silicone rubber to the uncured silicone rubber layer, and pressing the two surfaces under the influence of heat (progressively raising the temperature to about 200° C.) until a cured silicone rubber bond was obtained. It was found that this bond was as strong as the cured silicone rubber gasket and that attempts to strip away the cured silicone rubber gasket led to failure in either the latter or in the glue line before any substantial evidence that the bond between the magnesium and the silicone rubber comprising the glue line or the bond between the cured silicone rubber and the silicone rubber comprising the glue line failed.

EXAMPLE 8

Uncured titanium dioxide filled silicone rubber was molded under heat and pressure around a silver plated heavy copper conductor used as a short circuit tester. Previous to the molding step, the silver surface was treated with either dimethyltetrachlorodisilane or the mixture of high boiling methylchlorodisilanes described in Example 2 (supra) to improve the adhesion of the molded silicone rubber to the silver.

EXAMPLE 9

Cellulose acetate tape was dipped in concentrated dimethyltetrachlorodisilane, air-dried, and washed in water. Uncured silica-filled silicone rubber was sheeted and laid between two strips of the treated cellulose acetate in the form of a sandwich and the total assembly heated at about 100° C. for one hour to yield a flexible tape showing good adhesion between the cellulose acetate and the silicone rubber.

EXAMPLE 10

Pumpless power rectifiers or other vacuum seals may be made using my claimed invention by employing a silicone rubber seal. More particularly, instead of using usual gasketing seals such as aluminum, while simultaneously maintaining a vacuum by continuous pumping operations, I have found it possible to eliminate the necessity of pumps for such rectifiers while retaining the characteristic of a removable seal. Thus, the two metal faces of the housing flanges are treated with a composition comprising an organohalogenodisilane and spread uncured silicone rubber between the flanges, the assembly bolted tightly together and heated to effect a cure. The joint is heat stable and free of leaks, i. e., sufficiently vacuum-tight so that the "gettering" action of the rectifier in operation is much faster than any increase in pressure which may occur through, for instance, gassing, leakages, etc.

In making vacuum-tight and pressure-tight seals as in the manufacture of electrical discharge devices whereby, for example, glass-to-glass or glass-to-metal seals are desired, in addition to priming the surfaces of the abutting members of the seal prior to deposition on the said surfaces of the uncured silicone rubber, it has been found advantageous to use small per cents of vulcanizing agents, for example, of the order of from about 0.5 to 3 per cent benzoyl peroxide, tertiary butyl perbenzoate, zirconyl nitrate, etc. In addition, inorganic and organic materials such as stearic acid and lead oxide which are often incorporated in the fabrication of silicone rubber products, should be avoided. My invention is particularly adaptable for sealing the casings containing anodes and cathodes found in electrical discharge devices. Heretofore, vitreous uniting materials have been employed, but they have not been too satisfactory because of their tendency to chip with a resultant loss of vacuum.

What I claim as new and desire to secure by Letters Patent of the United States is:

1. The process for improving the adhesion to a solid surface, other than a cupreous surface, of an organopolysiloxane selected from the class consisting of (1) solid, elastic, curable organopolysiloxanes and (2) resinous organopolysiloxanes, which process comprises treating the said surface with a composition comprising a disilane corresponding to the general formula $(R)_n Si_2(X)_{6-n}$ where R is a monovalent hydrocarbon radical, X is a halogen, and $n$ is an integer equal to from 1 to 4, prior to applying the organopolysiloxane to the surface, and thereafter applying the aforesaid organopolysiloxane to the treated surface.

2. The process for improving the adhesion to a solid surface, other than copper, of an organopolysiloxane selected from the class consisting of (1) solid, elastic, curable organopolysiloxanes and (2) resinous organopolysiloxanes, which process comprises treating the said surface with a composition comprising a disilane corresponding to the general formula $(CH_3)_n Si_2(Cl)_{6-n}$ where $n$ is an integer equal to from 1 to 4, prior to applying the organopolysiloxane to the surface, and thereafter applying the aforesaid organopolysiloxane to the treated surface.

3. The process for improving the adhesion to a metallic surface other than copper of an organopolysiloxane selected from the class consisting of (1) solid, elastic, curable organopolysiloxanes and (2) resinous organopolysiloxanes, which process comprises applying to the said surface a thin coating of a composition comprising a disilane corresponding to the general formula $(CH_3)_n Si_2(Cl)_{6-n}$ where $n$ is an integer equal to from 1 to 4, prior to applying the organopolysiloxane to the surface, and thereafter applying the aforesaid organopolysiloxane to the treated surface.

4. The process for improving the adhesion to a siliceous surface of an organopolysiloxane selected from the class consisting of (1) solid, elastic, curable organopolysiloxanes and (2) resinous organopolysiloxanes, which process comprises coating the said surface with a composition comprising a disilane corresponding to the general formula $(CH_3)_n Si_2(Cl)_{6-n}$ where $n$ is an integer equal to from 1 to 4, prior to applying the organopolysiloxane to the surface, and thereafter applying the aforesaid organopolysiloxane to the treated surface.

5. The process for improving the adhesion to the surface of a solid, synthetic resin, of an organopolysiloxane selected from the class consisting of (1) solid, elastic, curable organopolysiloxanes and (2) resinous organopolysiloxanes, which process comprises treating the said surface with a composition comprising a disilane corresponding to the general formula $(CH_3)_n Si_2(Cl)_{6-n}$ where $n$ is an integer equal to from 1 to 4, prior to applying the organopolysiloxane to the surface, and thereafter applying the aforesaid organopolysiloxane to the treated surface of the solid synthetic resin.

6. The process for improving the adhesion to a solid surface, other than copper, of an organopolysiloxane selected from the class consisting of (1) solid, elastic, curable organopolysiloxanes and (2) resinous organopolysiloxanes, which process comprises treating the surface with a composition comprising a methylchlorodisilane containing at least two silicon-bonded chlorine atoms prior to applying the organopolysiloxane to the surface, and thereafter applying the aforesaid organopolysiloxane to the treated surface of the solid synthetic resin.

7. The process for improving the adhesion to a solid surface, other than copper, of an organopolysiloxane selected from the class consisting of (1) solid, elastic, curable organopolysiloxanes and (2) resinous organopolysiloxanes, which process comprises applying to the surface a composition comprising a mixture of disilanes corresponding to the formula $(CH_3)_n Si_2(Cl)_{6-n}$ where $n$ is an integer equal to from 1 to 4, and thereafter applying the aforesaid organopolysiloxane to the treated surface.

8. The process for improving the adhesion to aluminum of a solid, elastic, curable methylpolysiloxane, which process comprises applying to the surface of the aluminum a composition comprising dimethyltetrachlorodisilane prior to applying the said organopolysiloxane to the surface, and thereafter applying the aforesaid methylpolysiloxane to the treated surface.

9. The process for improving the adhesion to various metals, other than copper, of a resinous organopolysiloxane, which process comprises coating the surface of the metal with a composition comprising dimethyltetrachlorodisilane prior to applying the resinous organopolysiloxane to the surface, and thereafter applying the aforesaid organopolysiloxane to the treated surface.

10. The process for improving the adhesion to a ceramic surface of a solid, elastic, curable methylpolysiloxane, which process comprises coating the surface with a composition comprising dimethyltetrachlorodisilane prior to applying the said methylpolysiloxane to the surface, and thereafter applying the aforesaid methylpolysiloxane to the treated surface.

11. The process which comprises (1) coating a metallic surface other than a copper surface with a composition comprising dimethyltetrachlorodisilane, (2) applying to said coated surface a layer of a solid, elastic, curable methylpolysiloxane and (3) heating the total assembly until the said organopolysiloxane has reached the substantially cured stage.

12. The process which comprises (1) coating an aluminum surface with a composition comprising dimethyltetrachlorodisilane, (2) applying to said coated surface a layer of a solid, elastic, curable methylpolysiloxane and (3) heating the total assembly until the said organopolysiloxane has been converted to the substantially infusible, and insoluble state.

13. The process which comprises (1) treating a metal surface other than copper, with a composition comprising dimethyltetrachlorodisilane, (2) applying to said coated surface a resinous product comprising a methylphenylpolysiloxane resin, and (3) heating the total assembly until the resin has been converted to the infusible state.

14. The process which comprises (1) coating a glass surface with a composition comprising dimethyltetrachlorodisilane, (2) applying to said coated surface a solid, elastic, curable methylpolysiloxane and (3) heating the total assembly until the said methylpolysiloxane has been converted to the substantially infusible and insoluble state.

15. The process as in claim 12 wherein the methylpolysiloxane contains a filler.

16. The process as in claim 13 wherein the methylphenylpolysiloxane contains a filler.

17. The process as in claim 14 wherein the methylpolysiloxane contains a filler.

18. An article of manufacture comprising (1) an aluminum surface primed with a composition comprising a disilane corresponding to the general formula $(R)_n Si_2 (X)_{6-n}$ where R is a monovalent hydrocarbon radical, and $n$ is an integer equal to from 1 to 4 and (2) an adherent layer comprising a material selected from the class consisting of silicone resins and silicone rubbers bonded firmly to the primed aluminum surface.

19. An aluminum article as in claim 18 where the disilane comprises a methylchlorodisilane.

20. An aluminum article as in claim 18 where the silicone rubber is cured.

21. A flexible article of manufacture comprising (1) a flexible aluminum backing primed with a composition comprising a mixture of methylchlorodisilanes and (2) an adherent layer comprising a cured silicone rubber bonded firmly to the primed aluminum surface.

22. A vacuum-tight seal comprising adjacent members, the facing surfaces of which are primed with an organohalogenodisilane corresponding to the general formula $(R)_n Si_2 (X)_{6-n}$ where R is a monovalent hydrocarbon radical, X is a halogen and $n$ is an integer equal to from 1 to 4, and a cured layer of silicone rubber interposed between the aforesaid members and bonded directly to the treated surface of the said members.

23. A vacuum-tight seal comprising (1) adjacent members having a glass surface primed with a composition comprising methylchlorodisilane and (2) a layer of cured silicone rubber interposed between the adjacent members and bonded firmly to the primed surface.

24. A vacuum-tight seal comprising (1) two adjacent members the surface of one member being glass and the surface of the other member being metal, each of the surfaces of the two members being primed with a composition comprising a methylchlorodisilane to which said primed surfaces is firmly bonded a layer of cured silicone rubber.

25. A vacuum-tight and pressure-tight seal comprising (1) adjacent metal members the facing surfaces of which are primed with a composition comprising a methylchlorodisilane and (2) a layer of cured silicone rubber interposed between said surfaces and firmly bonded thereto.

ROBERT SMITH-JOHANNSEN.

REFERENCES CITED

The following references are of record in the file of this patent:

UNITED STATES PATENTS

| Number | Name | Date |
|---|---|---|
| 2,030,736 | Bley | Feb. 11, 1936 |
| 2,306,222 | Patnode | Dec. 22, 1942 |
| 2,386,466 | Hyde | Oct. 9, 1945 |
| 2,408,822 | Tanis | Oct. 8, 1946 |
| 2,418,935 | Hutchinson | Apr. 15, 1947 |
| 2,436,304 | Johannson | Feb. 17, 1948 |
| 2,445,572 | Gerould et al. | July 20, 1948 |

FOREIGN PATENTS

| Number | Country | Date |
|---|---|---|
| 116,470 | Australia | Jan. 19, 1943 |

OTHER REFERENCES

Modern Plastics, "Silicone Resin Bonded Laminates," March 1946, pp. 160–162.

Silicones and Other Organic Silicon Compounds" by Howard W. Post (1949), Reinhold Publishing Co., N. Y., page 189.